United States Patent
Mani et al.

(10) Patent No.: US 11,601,554 B2
(45) Date of Patent: Mar. 7, 2023

(54) DETECTION OF ACOUSTIC ECHO CANCELLATION

(71) Applicant: Imagination Technologies Limited, Kings Langley (GB)

(72) Inventors: Senthil Kumar Mani, Hyderabad (IN); Srinivas Akella, Hyderabad (IN); Anupama Ghantasala, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 174 days.

(21) Appl. No.: 16/920,518

(22) Filed: Jul. 3, 2020

(65) Prior Publication Data
US 2020/0336602 A1 Oct. 22, 2020

Related U.S. Application Data

(63) Continuation of application No. 14/870,458, filed on Sep. 30, 2015, now Pat. No. 10,841,431.

(30) Foreign Application Priority Data

Sep. 30, 2014 (GB) ...................... 1417263
Jun. 26, 2015 (GB) ...................... 1511278

(51) Int. Cl.
*H04M 9/08* (2006.01)
(52) U.S. Cl.
CPC ........... *H04M 9/082* (2013.01); *H04M 9/085* (2013.01)

(58) Field of Classification Search
CPC ...... H04M 9/082; H04M 9/085; G01R 23/18; H04B 3/23; H04B 3/234; H04B 3/237; H03H 21/0012
See application file for complete search history.

(56) References Cited

U.S. PATENT DOCUMENTS

| | | |
|---|---|---|
| 6,269,161 B1 | 7/2001 | Mclaughlin et al. |
| 7,266,465 B1 | 9/2007 | Tsui et al. |
| 8,306,215 B2 | 11/2012 | Takada |

(Continued)

FOREIGN PATENT DOCUMENTS

| | | |
|---|---|---|
| CN | 1223036 A | 7/1999 |
| CN | 102318328 A | 1/2012 |

(Continued)

OTHER PUBLICATIONS

Benesty et al., "Advances in Network and Acoustic Echo Cancellation", Berlin: Springer, 2001.

(Continued)

*Primary Examiner* — Angelica M McKinney
(74) *Attorney, Agent, or Firm* — Potomac Law Group, PLLC; Vincent M DeLuca

(57) ABSTRACT

An echo cancellation detector for controlling an acoustic echo canceller that is configured to cancel an echo of a far-end signal in a near-end signal in a telephony system, the echo cancellation detector comprising a comparison generator configured to compare the far-end signal with the near-end signal, a decision unit configured to make a determination about a first acoustic echo canceller based on that comparison and a controller configured to control an operation of a second acoustic echo canceller in dependence on the determination.

18 Claims, 7 Drawing Sheets

(56) References Cited

U.S. PATENT DOCUMENTS

| | | | | |
|---|---|---|---|---|
| 8,325,909 | B2* | 12/2012 | Tashev | H04M 9/082 |
| | | | | 379/406.05 |
| 9,083,783 | B2 | 7/2015 | Ikram | |
| 9,088,336 | B2 | 7/2015 | Mani et al. | |
| 9,288,578 | B2 | 3/2016 | Kim et al. | |
| 9,319,783 | B1* | 4/2016 | Barton | H04M 9/082 |
| 9,443,530 | B2 | 9/2016 | Kumar et al. | |
| 9,602,922 | B1 | 3/2017 | Yang | |
| 9,653,060 | B1 | 5/2017 | Hilmes et al. | |
| 9,659,555 | B1 | 5/2017 | Hilmes et al. | |
| 10,129,408 | B1* | 11/2018 | Åhgren | H04B 3/237 |
| 10,841,431 | B2* | 11/2020 | Mani | H04M 9/085 |
| 2003/0206624 | A1 | 11/2003 | Domer et al. | |
| 2004/0120271 | A1* | 6/2004 | LaBlanc | H04M 9/082 |
| | | | | 370/352 |
| 2005/0043893 | A1 | 2/2005 | Hickey, Jr. | |
| 2006/0222172 | A1 | 10/2006 | Chhetri et al. | |
| 2006/0280135 | A1* | 12/2006 | Mandelstam | H04M 9/082 |
| | | | | 379/406.01 |
| 2007/0058799 | A1 | 3/2007 | Sudo | |
| 2007/0121928 | A1 | 5/2007 | Beaucoup | |
| 2007/0280472 | A1 | 12/2007 | Stokes, III et al. | |
| 2008/0304675 | A1 | 12/2008 | Roovers | |
| 2012/0250882 | A1 | 10/2012 | Mohammad et al. | |
| 2012/0323571 | A1 | 12/2012 | Song et al. | |
| 2013/0216056 | A1 | 8/2013 | Thyssen | |
| 2013/0287226 | A1 | 10/2013 | Kerner | |
| 2014/0119518 | A1* | 5/2014 | Winterstein | H04M 9/082 |
| | | | | 379/32.01 |
| 2014/0278418 | A1 | 9/2014 | Chen et al. | |
| 2014/0328490 | A1 | 11/2014 | Mohammad et al. | |
| 2015/0011266 | A1* | 1/2015 | Feldt | H04M 9/082 |
| | | | | 455/570 |
| 2015/0078567 | A1 | 3/2015 | Mani et al. | |
| 2015/0086006 | A1 | 3/2015 | Kawabata | |
| 2015/0154977 | A1 | 6/2015 | Ekman et al. | |
| 2015/0249885 | A1 | 9/2015 | Kawabata et al. | |
| 2016/0019909 | A1 | 1/2016 | Shi et al. | |
| 2016/0029120 | A1 | 1/2016 | Nesta et al. | |
| 2016/0050489 | A1 | 2/2016 | Lashkari et al. | |
| 2016/0086618 | A1 | 3/2016 | Neoran et al. | |
| 2016/0127527 | A1 | 5/2016 | Mani et al. | |
| 2016/0134759 | A1 | 5/2016 | Mani et al. | |
| 2016/0205263 | A1 | 7/2016 | Liu et al. | |
| 2016/0277588 | A1 | 9/2016 | Jang et al. | |
| 2017/0064087 | A1 | 3/2017 | Mani et al. | |

FOREIGN PATENT DOCUMENTS

| | | |
|---|---|---|
| EP | 0565526 B1 | 5/1998 |
| EP | 2219037 A2 | 8/2010 |
| WO | 9403866 A1 | 2/1994 |
| WO | 2013142647 A1 | 9/2013 |
| WO | 2014070417 A2 | 5/2014 |

OTHER PUBLICATIONS

Breining et al. "Acoustic echo control—An Application of Very High Order Adaptive Filters", IEE Signal Proc. Magazine, pp. 42-69, Jul. 1999.

Faller et al. "Suppressing Acoustic Echo in a Spectral Envelope Space", IEE transactions on Speech and Signal Processing, Oct. 2005.

Hansler, "From algorithm to system—it's a rock road", International Workshop on Acoustic Echo and Noise Control, Sep. 1997.

http://developer.android.com/reference/android/media/audiofx/AcousticEchoCanceler.html.

Ye et al., "A new double-talk detection algorithm based on the orthogonality theorem", IEE Trans. Commun., vol. 39, No. 11, pp. 1542-1545, Nov. 1991.

Note: copies of NPL in parent application).

* cited by examiner

DETECTION OF ACOUSTIC ECHO CANCELLATION

CROSS-REFERENCE TO RELATED APPLICATIONS AND CLAIM OF PRIORITY

This application is a continuation of copending application Ser. No. 14/870,458 filed Sep. 30, 2015 under 35 U.S.C. 120, which claims foreign priority under 35 U.S.C. 119 from United Kingdom Application Nos. 1417263.9 filed Sep. 30, 2014, and 1511278.2 filed Jun. 26, 2015.

BACKGROUND

This invention relates to echo cancellation in telephony. In telephony, audio signals (e.g. including voice signals) are transmitted between a near-end and a far-end. Far-end signals which are received at the near-end may be outputted from a loudspeaker. A microphone at the near-end may be used to capture a near-end signal to be transmitted to the far-end. An "echo" occurs when at least some of the far-end signal outputted at the near-end is included in the near-end signal which is transmitted back to the far-end. In this sense the echo may be considered to be a reflection of the far-end signal. An example scenario is illustrated in FIG. 1a, which shows a signal being captured by a far-end microphone and output by a near-end loudspeaker. The echo is a consequence of acoustic coupling between the loudspeaker and the microphone; the microphone captures the signal originating from its own loudspeaker in addition to the voice of the near-end speaker and any near-end background noise. The result is an echo at the far-end loudspeaker. Echo cancellation is an important feature of telephony. Hands-free devices and teleconferencing, in particular, require echo cancellation that can adapt to environments having a wide range of acoustic characteristics. In these examples, a combination of factors contributes to echo being more of an issue. First, the volume at which the far-end signal is outputted from the near-end loudspeaker is typically loud enough that the far-end signal is a significant part of the signal captured by the near-end microphone. Second, the physical arrangement of the loudspeaker and microphone in these types of arrangements tends to result in a good acoustic coupling between the two.

Acoustic echo cancellers typically synthesise an estimate of the echo from the far-end voice signal. The estimated echo is then subtracted from the microphone signal. This technique requires adaptive signal processing to generate a signal accurate enough to cancel the echo effectively. An adaptive filter is often used to model the environment's acoustic impulse response.

An acoustic echo cancellation application often forms part of a user application, such as VoIP (Voice over Internet Protocol) software. There is an increased demand for high definition voice quality in VoIP communications. Some mobile phone vendors now incorporate an acoustic echo canceller (AEC) into their platform audio interface, which is accessible to user applications. When a user application that implements acoustic echo cancellation runs on a platform that also implements acoustic echo cancellation, this can have a severe impact on voice quality. FIG. 1b illustrates an implementation in which the two are cascaded. Non-linear modules such as a noise canceller, non-linear processor, comfort noise generator and automatic gain controller in the platform AEC can negatively impact the operation of the user application AEC. For example, the user application AEC models the echo path impulse response during the presence of far-end voice. This may cause it to regenerate echo that was cancelled by the platform AEC. Also, periods of double talk (DT) may be distorted or chopped due to the application AEC adapting to the high far-end signal.

The user application AEC should preferably be disabled if it is operating on a platform that also has an AEC in its audio interface. Some device vendors recognise the problem and provide information indicating the presence of a platform AEC through the relevant application programming interface (API). This information can be used to turn the application AEC ON or OFF, as appropriate. This approach is unreliable, however, as it is entirely dependent on device vendors providing the AEC information. Therefore there is a need for an improved mechanism for detecting the presence of a platform AEC.

SUMMARY OF THE INVENTION

According to a first embodiment, there is provided an echo cancellation detector for controlling an acoustic echo canceller that is configured to cancel an echo of a far-end signal in a near-end signal in a telephony system, the echo cancellation detector comprising a comparison generator configured to compare the far-end signal with the near-end signal, a decision unit configured to make a determination about a first acoustic echo canceller based on that comparison and a controller configured to control an operation of a second acoustic echo canceller in dependence on the determination.

The decision unit may be configured to make a determination as to whether a first acoustic echo canceller is present or not.

The controller may be configured to: responsive to a determination that the first acoustic echo canceller is present, control the second acoustic echo canceller to be in a state in which it is not operating; and responsive to a determination that the first acoustic echo canceller is present, control the second acoustic echo canceller to be in a state in which it is operating.

The controller may comprise a monitoring unit configured to monitor whether the first acoustic echo canceller is successfully removing far-end echo from a microphone signal in order to provide the near-end signal, the controller being configured to, responsive to a determination that the first acoustic echo canceller is not successfully removing far-end echo from the microphone signal, control the second acoustic echo canceller to be in a state in which it is operating to remove far-end echo from the near-end signal.

The comparison generator may be configured to compare an indication of the frequency spectrum of the far-end signal with an indication of the frequency spectrum of the near-end signal.

The comparison generator may be configured to compare a binary representation of the frequency spectrum of the far-end signal with a binary representation of the frequency spectrum of the near-end signal.

The comparison generator may comprise a frequency spectra generator configured to form a binary representation of a frequency spectrum by: representing a frequency bin in the frequency spectrum with a magnitude above a predetermined threshold as a first predetermined value in the binary representation; and representing a frequency bin with a magnitude below the predetermined threshold as a second predetermined value in the binary representation.

The frequency spectra generator may be configured to form the binary representation of the frequency spectrum to represent selected frequency bins only.

The frequency spectra generator may be configured to select the frequency bins to correspond to frequencies found in human speech.

The comparison generator may be configured to compare the far-end signal with the near-end signal by counting the number of corresponding frequency bins for which the binary representations of the far-end and near-end signals either both have the first predetermined value or both have the second predetermined value.

The comparison generator may be configured to: compare a binary representation of the near-end signal for the current frame with binary representations of the far-end signal for multiple previous frames; and add one unit to the count if a binary representation of the far-end signal for any of those previous frames comprises the first or second predetermined value for a frequency bin that corresponds to a frequency bin in which the binary representation of the near-end signal for the current frame has the same respective first or second predetermined value.

The comparison generator may be configured to average the count with one or more counts generated by comparing preceding frames of the near-end signal and the far-end signal.

The controller may be configured to: if the averaged count is below a predetermined threshold, control the second acoustic canceller to be in a state in which it is not operating; and if the averaged count is above the predetermined threshold, control the second acoustic canceller to be in a state in which it is operating.

The echo cancellation detector may be configured to confirm the presence of far-end voice before comparing the far-end signal with the near-end signal.

According to a second embodiment, there is provided a method for cancelling an echo of a far-end signal in a near-end signal in a telephony system, the method comprising comparing the far-end signal with the near-end signal, making a determination about a first acoustic echo canceller based on that comparison and operating a second acoustic echo canceller in dependence on the determination.

The method may comprise making a determination as to whether a first acoustic echo-canceller is present or not.

The method may comprise: responsive to a determination that the first acoustic echo canceller is present, causing the second acoustic echo canceller to be in a state in which it is not operating; and responsive to a determination that the first acoustic echo canceller is not present, causing the second acoustic echo canceller to be in a state in which it is operating.

The method may comprise, if the first acoustic echo canceller is determined to be present: monitoring whether the first acoustic echo canceller is successfully removing far-end echo from a microphone signal in order to provide the near-end signal; and responsive to a determination that the first acoustic echo canceller is not successfully removing far-end echo from the microphone signal, causing the second acoustic echo canceller to be in a state in which it is operating to remove far-end echo from the near-end signal.

The method may comprise comparing an indication of the frequency spectrum of the far-end signal with an indication of the frequency spectrum of the near-end signal.

The method may comprise comparing a binary representation of the frequency spectrum of the far-end signal with a binary representation of the frequency spectrum of the near-end signal.

The method may comprise forming the binary representation of a frequency spectrum by: representing a frequency bin in the frequency spectrum with a magnitude above a predetermined threshold as a first predetermined value in the binary representation; and representing a frequency bin with a magnitude below the predetermined threshold as a second predetermined value in the binary representation.

The method may comprise forming the binary representation of the frequency spectrum to represent selected frequency bins only.

The method may comprise selecting the frequency bins to correspond to frequencies found in human speech.

The method may comprise comparing the far-end signal with the near-end signal by counting the number of corresponding frequency bins for which the binary representations of the far-end and near-end signals either both have the first predetermined value or both have the second predetermined value.

The method may comprise: comparing a binary representation of the near-end signal for the current frame with binary representations of the far-end signal for multiple previous frames; and adding one unit to the count if a binary representation of the far-end signal for any of those previous frames comprises the first or second predetermined value for a frequency bin that corresponds to a frequency bin in which the binary representation of the near-end signal for the current frame has the same respective first or second predetermined value.

The method may comprise averaging the count with one or more counts generated by comparing preceding frames of the near-end signal and the far-end signal.

The method may comprise: if the averaged count is below a predetermined threshold, causing the second acoustic canceller to be in a state in which it is not operating; and if the averaged count is above the predetermined threshold, causing the second acoustic canceller to be in a state in which it is operating.

The method may comprise confirming the presence of far-end voice before comparing the far-end signal with the near-end signal.

According to a third embodiment, there is provided a comparison generator for determining the similarity between a first signal and a second signal, the comparison generator comprising a frequency spectra generator configured to obtain a frequency spectrum of both signals and for each frequency spectrum, form a binary representation of that spectrum by representing a frequency bin having a magnitude above a predetermined threshold in the frequency spectrum with a first predetermined value and a frequency bin having a magnitude below the predetermined threshold in the frequency spectrum as a second predetermined value, the comparison generator being configured to compare the binary representations of the first and second signals and count the number of corresponding frequency bins for which the binary representations of the first and second signals either both have the first predetermined value or both have the second predetermined value.

The comparison generator may be configured to compare a binary representation of the first signal for a current frame with binary representations of the second signal for multiple previous frames and add one unit to the count if a binary representation of the second signal for any of those previous frames comprises the first or second predetermined value for a frequency bin that corresponds to a frequency bin in which the binary representation of the first signal for the current frame has the same respective first or second predetermined value.

The comparison generator may be configured to average the count with one or more counts generated by comparing preceding frames of the first and second signals.

The frequency spectra generator may be configured to form the binary representation of the frequency spectrum to represent selected frequency bins only.

The frequency spectra generator may be configured to select the frequency bins to correspond to frequencies found in human speech.

The comparison generator may be configured to determine the similarity between a near-end signal and a far-end signal in a telephony system.

An echo cancellation detector may comprise a comparison generator, the echo cancellation detector further comprising a decision unit configured to make a determination about a first acoustic echo canceller in dependence on the determined similarity between the near end and far end signals.

The decision unit may be configured to make a determination about whether a first acoustic echo canceller is present in the telephony system or not.

The echo cancellation detector may be further comprising a controller configured to operate the second acoustic echo canceller in dependence on the determination.

The echo cancellation detector may be being configured to: if the averaged count is below a predetermined threshold, cause the second acoustic echo canceller to be in a state in which it is not operating; and if the averaged count is above the predetermined threshold, cause the second acoustic echo canceller to be in a state in which it is operating.

According to a fourth embodiment, there is provided a method for determining the similarity between a first signal and a second signal comprising obtaining a frequency spectrum of both signals, for each frequency spectrum, forming a binary representation of that spectrum by representing a frequency bin having a magnitude above a predetermined threshold in the frequency spectrum with a first predetermined value and a frequency bin having a magnitude below the predetermined threshold in the frequency spectrum as a second predetermined value, comparing the binary representations of the first and second signals and counting a number of corresponding frequency bins for which the binary representations of the first and second signals either both have the first predetermined value or both have the second predetermined value.

The method may comprise comparing a binary representation of the first signal for a current frame with binary representations of the second signal for multiple previous frames and adding one unit to the count if the binary representation of the second signal for any of those previous frames comprises the first or second predetermined value for a frequency bin that corresponds to a frequency bin in which the binary representation of the first signal for the current frame has the same respective first or second predetermined value.

The method may comprise averaging the count with one or more counts generated by comparing preceding frames of the first and second signals.

The method may comprise forming the binary representation of the frequency spectrum to represent selected frequency bins only.

The method may comprise selecting the frequency bins to correspond to frequencies found in human speech.

The method may comprise using said method to determine the similarity between a near-end signal and a far-end signal in a telephony system.

The method may comprise making a determination about a first acoustic echo canceller in dependence on the determined similarity between the near end and far end signals.

The method may comprise making a determination about whether a first acoustic echo canceller is present in the telephony system or not.

The method may comprise operating the second acoustic echo canceller in dependence on the determination.

The method may comprise: if the averaged count is below a predetermined threshold, causing the second acoustic echo canceller to be in a state in which it is not operating; and if the averaged count is above the predetermined threshold, causing the second acoustic echo canceller to be in a state in which it is operating.

The present invention will now be described by way of example with reference to the accompanying drawings. In the drawings:

DETAILED DESCRIPTION

Figure 3:
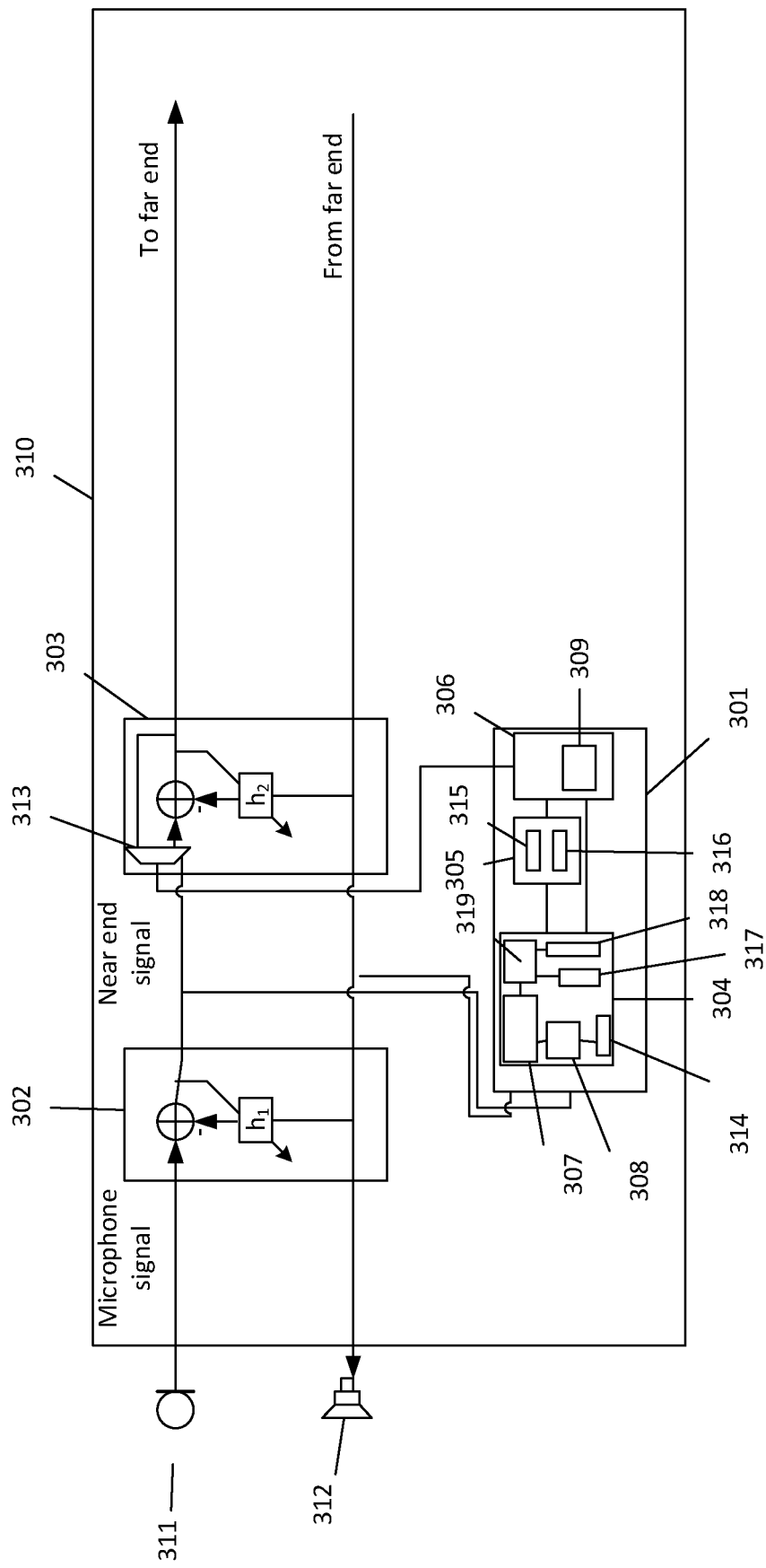
FIG. 3 shows an example of an echo cancellation detector.

A first AEC and a second AEC may be arranged in a cascaded configuration (an example of this type of arrangement is shown in FIG. 3). The first AEC may be configured to receive a signal captured by a microphone. This signal may be termed the "microphone signal" and it will typically include near-end talk, local noise and an echo of the far-end signal. The signal received by the second AEC may be termed a "near-end signal". If the second AEC is cascaded with a first AEC, the near-end signal will be the signal output by the first AEC. If the first AEC is not present, the near-end signal will be the same as the microphone signal. To avoid any confusion, the signal received by the second AEC will consistently be referred to as the "near-end signal" herein, irrespective of whether that signal is the same or different from the microphone signal.

Figure 1A:
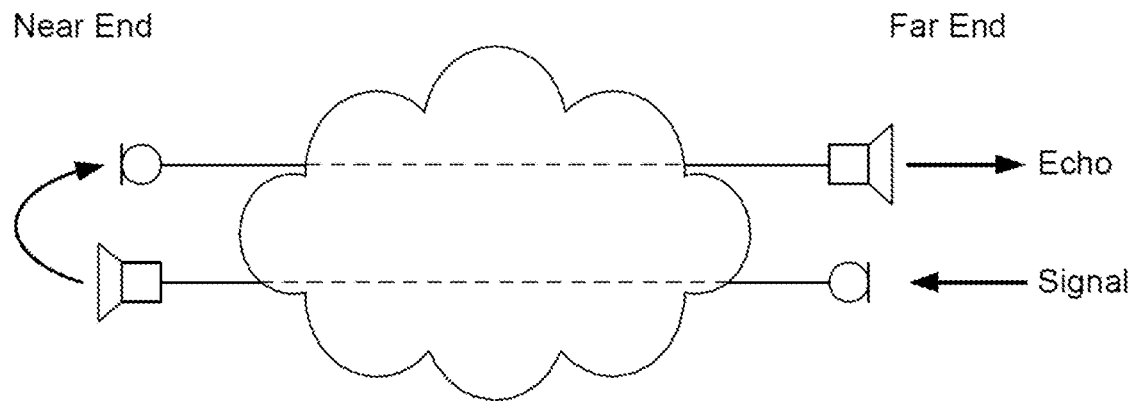
FIG. 1a shows an architecture of an exemplary echo path monitoring system.
Figure 2:
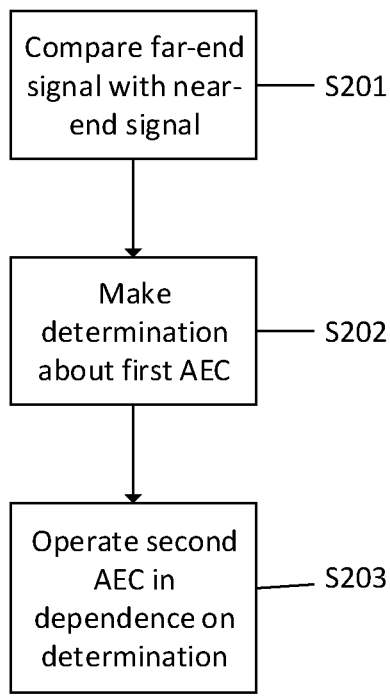
FIG. 2 shows an example of a method for controlling a user application AEC.
Figure 1B:
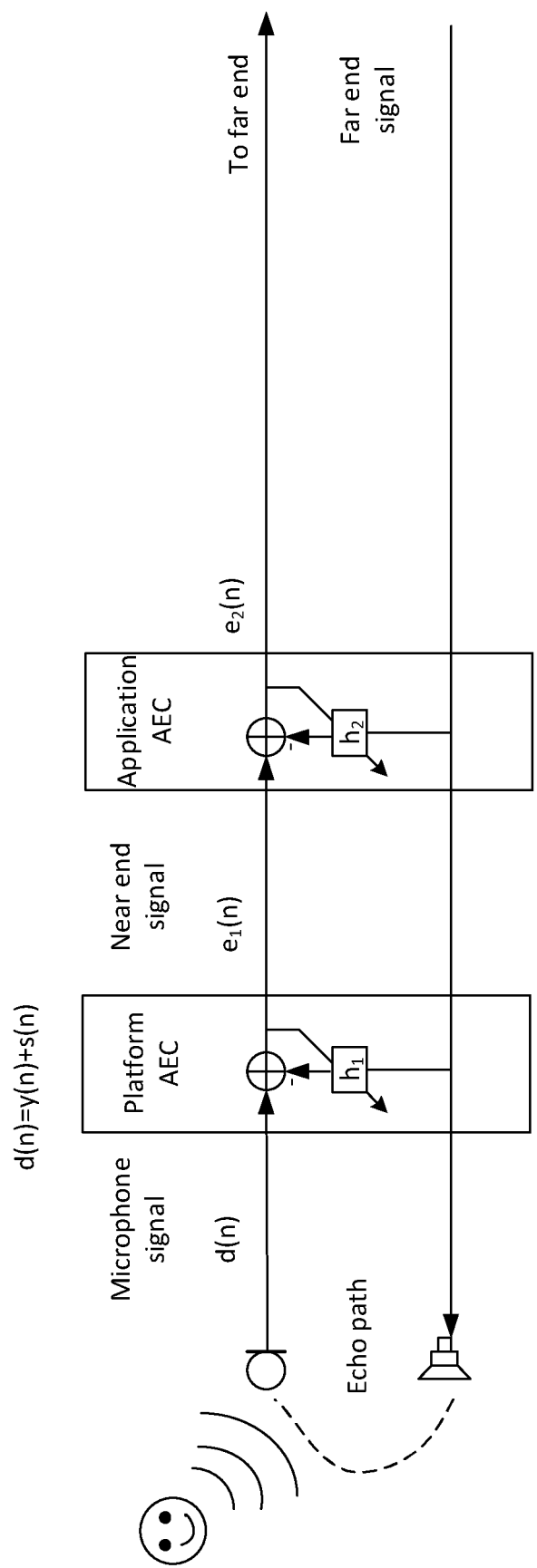
FIG. 1b shows a platform AEC and a user application AEC in a cascaded configuration.

An overview of a method for controlling an acoustic echo canceller (AEC) in a telephony system is shown in FIG. 2. The method comprises comparing the far-end signal with the near-end signal (step S201) and using that comparison to make a determination about a first AEC (step S202). That determination might be, for example, whether a first AEC is present in the telephony system or not, or whether the first AEC is removing echo of the far-end signal successfully. The determination is preferably made at runtime. The method then comprises operating a second AEC in dependence on the determination that has been made about the first AEC (step S203). This will usually include either ensuring that the second AEC is enabled or ensuring that it is disabled. In most implementations, the second AEC will be enabled by default and so operating the second AEC in dependence on the determination about the first AEC will involve either disabling the second AEC or leaving it switched on. It might also involve controlling any aspect of the second AEC's operation, e.g. the degree to which it removes echo from the near-end signal or the way in which it models that echo.

An overview of an apparatus for controlling an acoustic echo canceller is shown in FIG. 3. The apparatus is represented generally by echo cancellation detector 301.

In this example the echo cancellation detector forms part of a wider telephony system 310. The telephony system in this example comprises two AECs: first AEC 302 and second AEC 303. The echo cancellation detector is preferably configured to receive the far-end signal and the near-end signal. It comprises a comparison generator 304, which may be configured to compare the near-end and far-end signals. The result of this comparison is suitably passed to decision unit 305. The decision unit is preferably configured to make a determination about the first AEC based on the comparison. This determination is suitably passed to controller 306. The controller 306 may be configured to control an operation of the second AEC in dependence on the determination.

In one example the comparison generator 304 may be configured to compare the near-end and far-end signals using a particular algorithm, which is described in more detail below. A comparison generator configured this way may include a re-sampler 307, a frequency spectra generator 308 (which may be configured to generate any type of frequency spectra, including binary spectra) and a voice activity detection module 314. It may also include an averaging unit 317, a counter 318 and a comparison unit 319 that may be configured to directly compare binary frequency spectra corresponding to the near-end and far-end signals output by the frequency spectra generator 308. Decision unit 305 may include decision logic 315 and a computation module 316. The controller 306 may also comprise a monitoring unit 309 for monitoring how successfully echo is being removed from the microphone signal by the first AEC 302.

The echo cancellation detector 301 is preferably configured to control the second AEC 303 to only be in a state in which it is operating if the first AEC 302 is either absent or underperforming (in FIG. 3 this is represented by the echo cancellation detector controlling multiplexer 313, which enables the second AEC to be bypassed). The first AEC may be therefore considered to effectively take precedence over the second. There may be a number of practical reasons for preferring one AEC over the other. For example, the first AEC may be a platform AEC: an AEC that forms an integral part of the platform underlying the telephony system and is likely to have been installed at manufacture. The second AEC may be a user application AEC: part of a program installed by the user on the telephony system after manufacture. In this scenario the platform AEC may have been designed specifically for the platform in question and thus expected to perform well in most scenarios. The user application AEC is likely to have been developed as a general purpose AEC capable of being implemented on many different platforms. Thus the platform AEC might be expected to perform better on a particular platform than the more general user application AEC. Another reason for preferring one AEC over the other might simply be a question of control: the echo cancellation detector may not have the capability to disable a platform AEC, whereas it may be able to disable the user application AEC.

Both AECs might be implemented in either hardware or software and will frequently be implemented by a combination of the two.

The telephony system could be, for example, a mobile telephone, a teleconferencing system, a landline connected phone, a telephony application on a computing device or any other communication system. It should be understood that the telephony system may include any component or functional block found in typical communication systems. For example, a typical telephony system may include one or more of: a microphone 311, loudspeaker 312, modem, antenna, signal processor, analogue-to-digital converter, digital-to-analogue converter, filter, noise canceller, automatic gain controller, comfort noise generator etc. (most of which are not shown in FIG. 3).

The structures shown in FIG. 3 are intended to correspond to a number of functional blocks in an apparatus. This is for illustrative purposes only. FIG. 3 is not intended to define a strict division between different parts of hardware on a chip or between different programs, procedures or functions in software. In some embodiments, some or all of the procedures described herein may be performed wholly or partly in hardware. In some implementations, the echo cancellation detector 301, comparison generator 304, decision unit 305, controller 306, monitoring unit 309 and frequency spectra generator 308 may be implemented by a processor acting under software control (e.g. the processor shown in FIG. 3). Any such software is preferably stored on a non-transient computer readable medium, such as a memory (RAM, cache, FLASH, ROM, hard disk etc.) or other storage means (USB stick, FLASH, ROM, CD, disk etc). In one embodiment, the echo cancellation detector may form part of a user application that implements a user application AEC.

More detailed embodiments will now be described with reference to a scenario in which the first AEC 302 is a platform AEC and the second AEC 303 is a user application AEC. This is for the purposes of example only and it should be understood that the methods and apparatus described herein might be used to control any type of AEC.

By making a determination about a platform AEC in dependence on the far-end signal and the near-end signal, the determination becomes independent of any information provided by the platform manufacturer. Thus operation of the user application AEC is not dependent on the platform making information available over an API nor does control of the user application AEC have to be adapted to a particular information format. Additionally it becomes possible not only to control the user application AEC in dependence on just the presence of a platform AEC, but also on how successful that platform AEC is actually proving to be at removing far-end echo from the microphone signal to form the near-end signal, which is provided to the application AEC 303.

The platform AEC is expected to normally perform well, since it is tuned specifically to a given device. Thus if the presence of a platform AEC is confirmed, the user application AEC is preferably disabled to minimize the speech quality degradation and reduce CPU load. If the platform AEC is not performing as expected, however, the user application AEC may be either not disabled or is re-enabled. In this case, the user application AEC helps to cancel the unwanted echo.

Comparing the near-end signal and the far-end signal provides an indication of how similar to the two signals are to each other. This also indicates whether the near-end signal includes a significant echo of the far-end signal, which in turn indicates the absence (or underperformance) of a platform AEC. There are many different techniques that might be used to compare the two signals, and it should be understood that the method described herein encompasses using any suitable technique. In particular the comparison could be computed in either the time or frequency domain.

Many existing comparison techniques are not preferred, however, because they are of high computational complexity and incorporate an inherent delay in providing an indication of similarity. A new technique for comparing two signals is described below. This technique is described in the context of making a determination about a platform AEC but this is for the purposes of example only. The technique might be usefully employed in many other applications in which two signals are compared with each other.

The comparison method described below is capable of detecting the presence and/or performance of a platform AEC at runtime. It uses less than 10 seconds, preferably less than 5 seconds and most preferably less than 2 seconds of far-end voice to confirm the presence and/or performance of a platform AEC. Indeed the comparison method can confirm the presence of far-end voice with approximately 1 second of far-end voice. A key component of the method is a technique that correlates the binary spectra of near-end and far-end signals. It estimates the moving average of a similarity metric between those input binary spectra.

Figure 4:
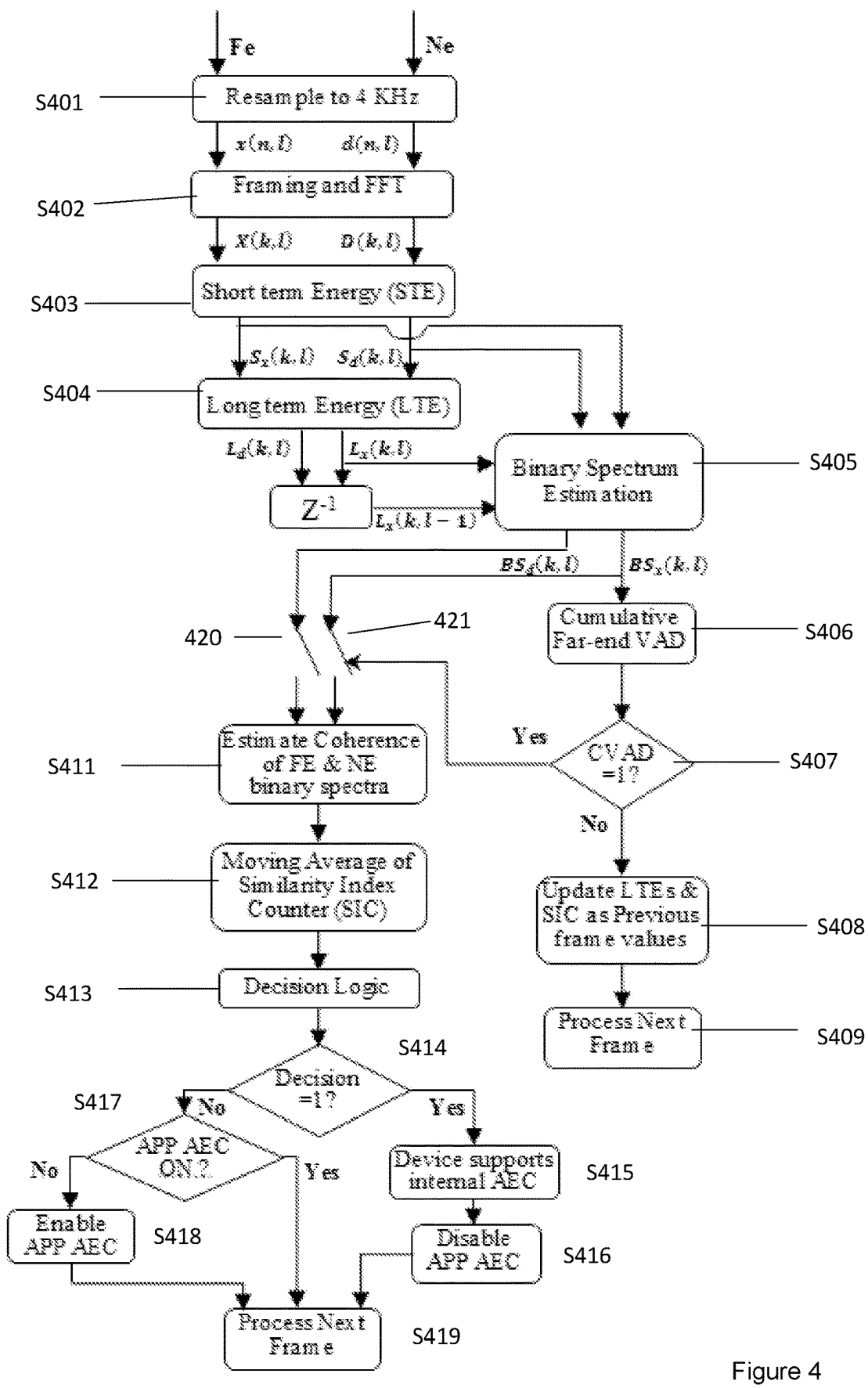
FIG. 4 shows an example of a method for measuring a similarity metric between two signals.

FIG. 4 shows a block diagram of the comparison method, together with decision logic suitable for platform AEC detection. The method is described using equations that refer primarily to the far-end signal. This is demonstrated by the use of the subscript "x" in the equations below to represent the far-end signal. The same equations and accompanying description apply equally to the near-end signal (represented by the subscript "d").

The process starts in step 401 with both the near-end and far-end signals being resampled using the re-sampler 307. A suitable sampling rate might, for example, be 4 kHz. Resampling the signals reduces the complexity of the subsequent operations and renders the algorithm independent from the original sampling rate of the signals.

In step 402 the signals are reframed. A suitable frame size for the incoming signals is 10 ms (i.e. 40 samples at a sampling rate of 4 kHz). These samples are then concatenated with previous samples of the near-end and far-end signals. In one example, the incoming samples are concatenated with 88 previous samples. The samples are then converted into the frequency domain, e.g. by using a 128 point Fast Fourier Transform (FFT), by frequency spectra generator 308.

The algorithm then computes a short term energy of the far-end signal and the near-end signal (step S403). Averaging over a number of previous frames provides better frequency localisation. An average of K consecutive frames may be used for further processing:

$$X(m, l) = \frac{1}{K}\sum_{n=0}^{K-1} X_f(m, l-n) \quad (1)$$

in which $X_f(m,l-n)$ represents the FFT of the $l-n^{th}$ frame and $m^{th}$ frequency bin and $X(m, l)$ represents the average FFT of the past K frames. In one example K=4.

To reduce complexity and improve accuracy, the algorithm may focus on the frequency bins that typically show a dominant speech presence, ignoring those which typically do not form part of human speech. A suitable frequency range is 320 Hz to 1400 Hz. If a frequency range of between 0 and 4 kHz is mapped onto 64 frequency bins, this typical speech range corresponds to m=12 to 43, where $1 \leq m \leq 64$.

The short term energy at the $l^{th}$ frame and $c^{th}$ frequency bin (where c represents the frequency bins of the frequency range suitable for human speech, e.g. in this example c=m−12) may be estimated as follows:

$$S_x(c,l) = Re(X(11+c,l))^2 + Img(X(11+c,l))^2 \text{ where } (0 \leq c \leq 31) \quad (2)$$

The long term energy of each frame is then estimated in step S404. This may be achieved by averaging the short term energy, $S_x(c,l)$, e.g. using a first order adaptive filter. The long term energy of the $l^{th}$ frame, $L_x(c,l)$, may be obtained as follows:

$$\Delta_x(c,l) = S_x(c,l) - L_x(c,l-1)$$

$$L_x(c,l) = L_x(c,l-1) + (\alpha_x(l) * \Delta_x(c,l)) + \gamma_x(l) \quad (3)$$

Filter coefficient $\alpha_x(l)$ and affine offset $\gamma_x(l)$ may be determined by $\Delta_x(c, l)$. For example:

$$\alpha_x(l) = \begin{cases} \beta_3; & \text{if } (\Delta_x(c, l) < \beta_1) \\ 0; & \text{if } (\Delta_x(c, l) > \beta_1) \\ \beta_4; & \text{otherwise} \end{cases} \quad (4)$$

$$\gamma_x(l) = \begin{cases} 0; & \text{if } (\Delta_x(c, l) < \beta_1) \\ \beta_5; & \text{if } (\Delta_x(c, l) > \beta_1) \\ 0; & \text{otherwise} \end{cases} \quad (5)$$

where $\beta_1$, $\beta_3$, $\beta_4$ and $\beta_5$ are parameters which can be set to suitable values for a specific implementation.

Binary spectrums can be calculated by frequency spectra generator 308 from the estimated short-term and long-term average energies (step S405). The process involves looking at the energy content of each frequency bin and setting the binary spectrum to a '1' in respect of a bin that indicates the presence of speech and a '0' in respect of a bin that indicates the absence of speech. In this way, the binary spectrums indicate the presence or absence of speech in the respective frequency bins. The binary spectrum $BS_x(c, l)$ for the $l^{th}$ frame and the $c^{th}$ frequency bin is given by:

$$BS_x(c, l) = \begin{cases} 1; & \text{if } ((S_x(c, l) > \alpha * L_x(c, l)) \& (L_x(c, l) > \zeta_2)) \\ 0; & \text{otherwise} \end{cases} \quad (6)$$

where $\alpha$ and $\zeta_2$ are parameters which can be set to suitable values for a specific implementation.

At least some of the far-end signal can be included as echo in the microphone output due to acoustic coupling between the loudspeaker 312 and the microphone 310. Before the near and far-end spectra are compared, the process suitably checks whether there is a far-end signal which might be causing echo. If the far-end party is silent, there will be no far-end echo and computational effort can be saved. The decision logic and computation modules that are comprised in decision unit 305 and which are configured for similarity index computation (described below) can stay inactive until a far-end voice signal is present.

Suitably the method checks whether far-end voice is present by reviewing the content of the past M frames. The value of M depends on a maximum pure delay and/or sparse echo path delay that is expected between the far-end and near-end signals. This may be determined by observing the delay experienced across different calls with different devices. This will typically be determined in advance and programmed into echo cancellation detector 305 but could be determined by echo cancellation detector 305 in realtime. A typical delay is a pure delay of around 1 second, corresponding to M=100 frames for a frame rate of 100 frames per second.

The comparison generator 304 may comprise a voice detection module 314 that is configured to perform the process of voice activity detection (VAD). It may check for the presence of far-end voice by first looking at the current frame and then combining this with determinations made previously about the preceding M frames (step S406). A decision about whether there is far-end voice in the current frame can be made by checking whether the total number of active far-end frequency bins in the binary spectrum is greater than a pre-defined threshold:

$$vad_x(l) = \begin{cases} 1; & \text{if } \left(\sum_{c=0}^{31} BS_x(c, l)\right) > \zeta_1 \\ 0; & \text{otherwise} \end{cases} \quad (7)$$

To take account of pure delay in the echo path, cumulative far-end voice activity for the past M frames can be determined:

$$cvad_x = \sum_{i=0}^{M-1} vad_x(l-i) \quad (8)$$

If $cvad_x$ is '0', it indicates that the far-end signal has not contained voice in the past M frames, i.e. the party at the far-end is silent. The decision logic and computation modules for similarity index computation that are comprised in decision unit 305 (and are shown at 315 and 316 respectively) can thus stay inactive, as indicated by step S407 in FIG. 4 and its control of switches 420 and 421. In this scenario, the long term energy and similarity counter values are left as for the preceding frame (step S408) before the algorithm moves onto the next frame (step S409).

FIG. 4 and the description above describe an implementation in which far-end voice activity is detected using the binary spectrum, which is a particularly straightforward way of making the decision about whether far-end voice is present or not. Alternatively far-end voice activity may be detected using another technique, e.g. by using the frequency spectra of the far-end and near-end signals, in which case the calculation of the binary frequency spectra may be left until after far-end voice activity has been confirmed.

The process of voice activity detection may be repeated until far-end voice is detected. Once a far-end voice activity is confirmed, the near-end and far-end binary spectra are compared by comparison unit 319 to determine their similarity (step S411). Any suitable comparison operation might be employed, but a particularly straightforward implementation can be achieved by invoking a counter 318 to count the number of matched frequency bins in the far-end and near-end binary spectra. This counter provides an indication of the correlation between the two signals.

$$BS_s(c, l) = L * \max\{\text{AND } (BS_x(c, l-i), BS_d(c, l))\}_{i=0}^{M-1} \quad (9)$$

Here subscript "d" refers to the near-end signal.

Thus $BS_s(c, l)$ is either '0' or L, depending on whether a '1' in the $c^{th}$ frequency bin of the binary spectrum of the near-end signal matches a '1' in the $c^{th}$ frequency bin of one of the binary spectra of the preceding M frames of the far-end signal. L is an optional implementation constant for increasing fixed point precision.

$BS_s(c, l)$ can be termed the similarity binary spectrum. The number of active bins in the similarity binary spectrum can be termed the similarity bin counter, SIC(l), and it can be estimated as follows:

$$SIC(l) = \sum_{c=0}^{31} BS_s(c, l) \quad (10)$$

The moving average of the similarity bin counter can then be estimated by averaging unit 317 (step S412):

$$\Delta_{sic}(l) = SIC(l) - \overline{SIC}(l) \quad (11)$$

$$\overline{SIC}(l) = \begin{cases} \overline{SIC}(l) + \beta_6 * \Delta_{sic}(l); & \text{if } SIC(l) > \zeta_6 \\ \overline{SIC}(l) + \beta_7 * \Delta_{sic}(l); & \text{otherwise} \end{cases} \quad (12)$$

where $\beta_6$, $\beta 3_7$ and $\zeta_6$ are parameters which can be set to suitable values for a specific implementation.

The presence of a platform AEC can be confirmed by the moving average of the similarity bin counter, $\overline{SIC}(l)$, being continuously lower than a predefined threshold, $\zeta_6$, for M frames. Thus the output of the similarity bin counter is passed to decision logic 315 (step S413). The decision itself is represented by step S414 in FIG. 4. Once the presence of a platform AEC has been confirmed (step S415), the application AEC can be disabled (step S416). Otherwise the current operational state of the application AEC is checked (step S417), before the application AEC is enabled if required (step S418). The process then moves onto the next frame (step S419).

The presence of a platform AEC does not automatically mean that far-end echo will be successfully removed from the microphone signal. In particular, the performance of a platform AEC can vary in dependence on the play volume: platform AECs tend to perform well when the play volume is low and more poorly when the play volume is higher. Thus it may be advantageous to disable the application AEC when the play volume is low but enable it when the play volume is high. This could be achieved by monitoring the play volume but an approach that is more generally useful is to monitor the success of the platform AEC in removing far-end echo. One option for achieving this is to simply run the algorithm described above continuously since it determines whether far-end echo has been successfully removed or not as part of checking for the presence of a platform AEC (as represented by step S419 in FIG. 4).

Performance of the algorithm described herein has been tested in three different acoustic echo regions: far-end single talk, double talk and near-end single talk regions. It has also been tested across different audio modes such as: 1) handsfree or loud speaker mode; 2) handset or receiver mode; and 3) headset mode. Two metrics were used to evaluate the performance of the algorithm: detection delay and false alarm. "Detection delay" is the time taken to confirm the presence of an AEC in the platform audio interface. "False alarm" is the incorrect confirmation of a platform AEC. Performance of the algorithm was tested across four different reference platforms (each being a particular model of communication device, with a particular operating system).

Figure 5:
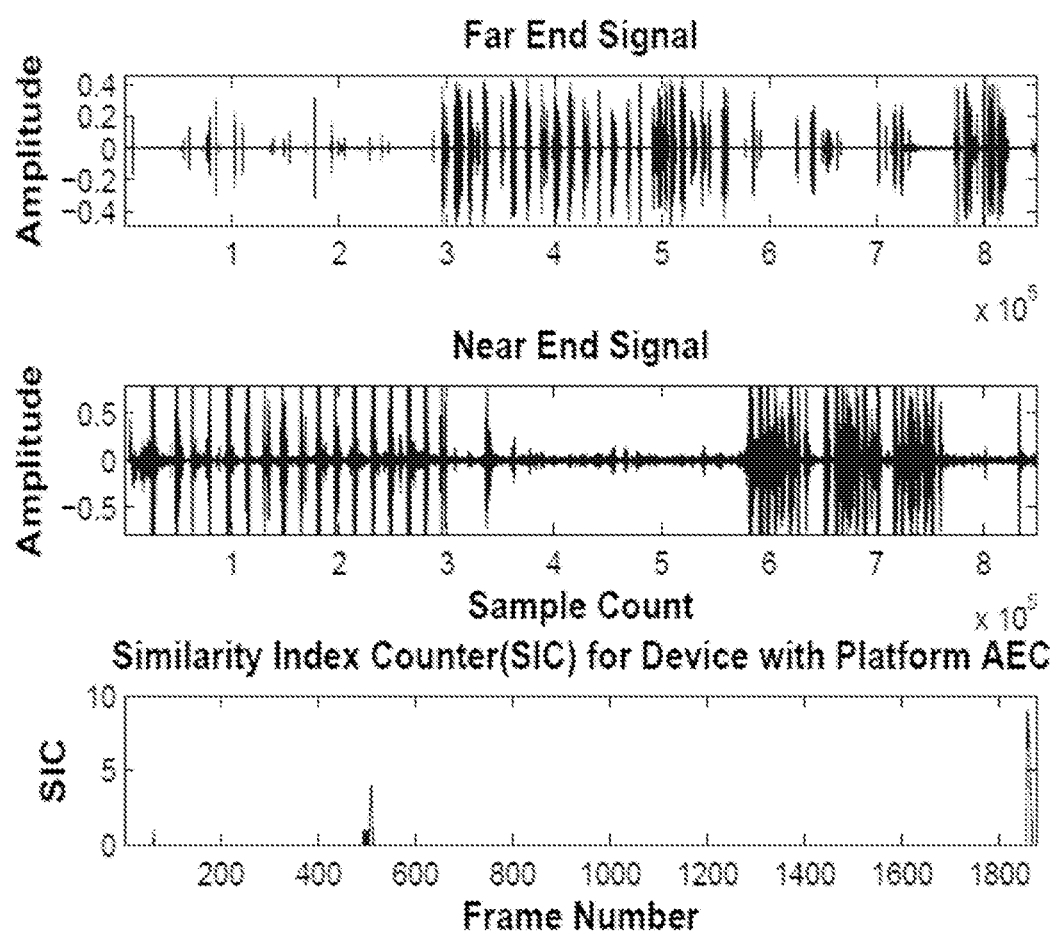
FIG. 5 shows a similarity index counter for a device containing a platform AEC.
Figure 6:
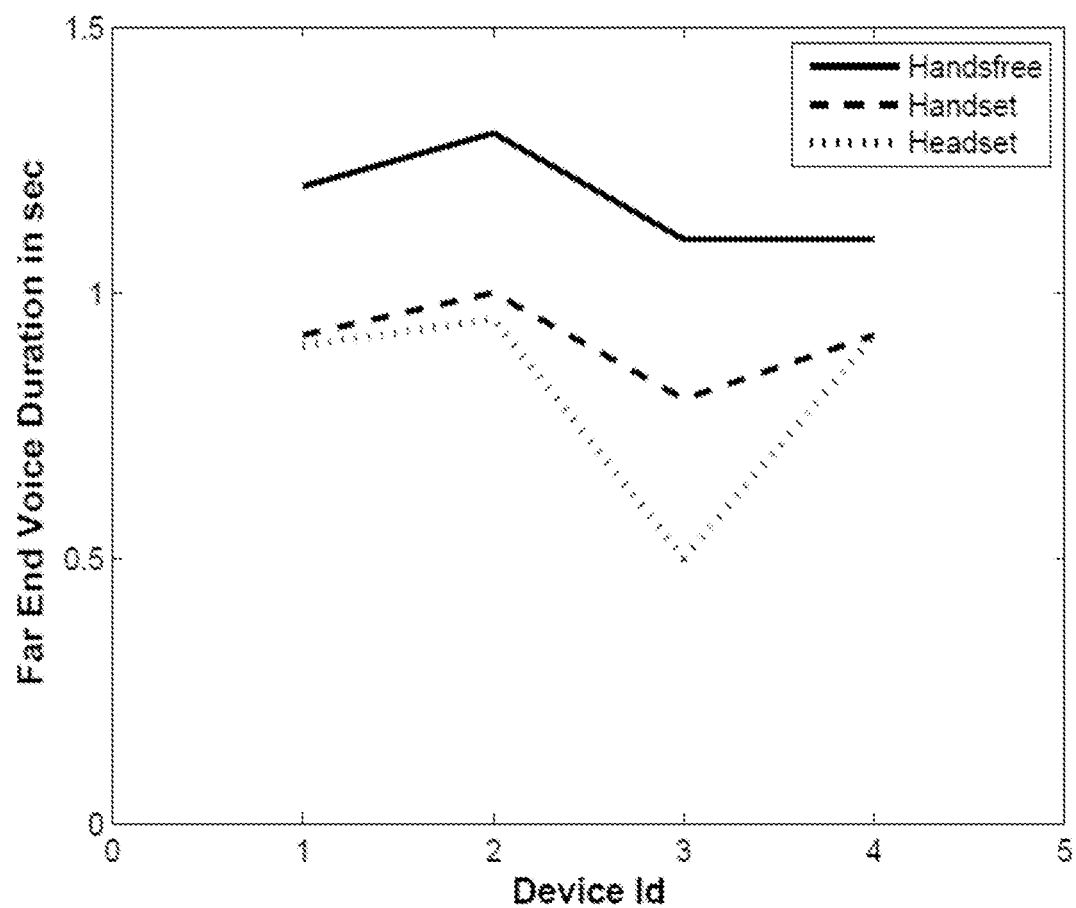
FIG. 6 shows the detection delay of the algorithm during different audio modes.

For all testing, the parameters were initialized to the values provided in Table 1 (see below). The communication devices tested all had a platform AEC. The proposed algorithm disabled the application AEC in all communication devices. FIG. 5 illustrates the Similarity Index Counter (SIC) during a double talk session. In FIG. 5, the near-end signal contains pure near end single talk without any echo. Far-end echo has been cancelled by the platform AEC. Hence, SIC is consistently zero except at few places where it has very low value (<10). As the SIC value is essentially zero, the application AEC is disabled after M far-end voice frames. FIG. 6 illustrates the average duration of far-end voice taken by the algorithm to confirm the presence of an AEC in the platform audio interface. The algorithm takes approximately 1.17 sec, 0.91 sec and 0.8 sec of far-end voice data to confirm the presence of AEC in platform for hands-free, handset and headset audio modes respectively.

Figure 7:
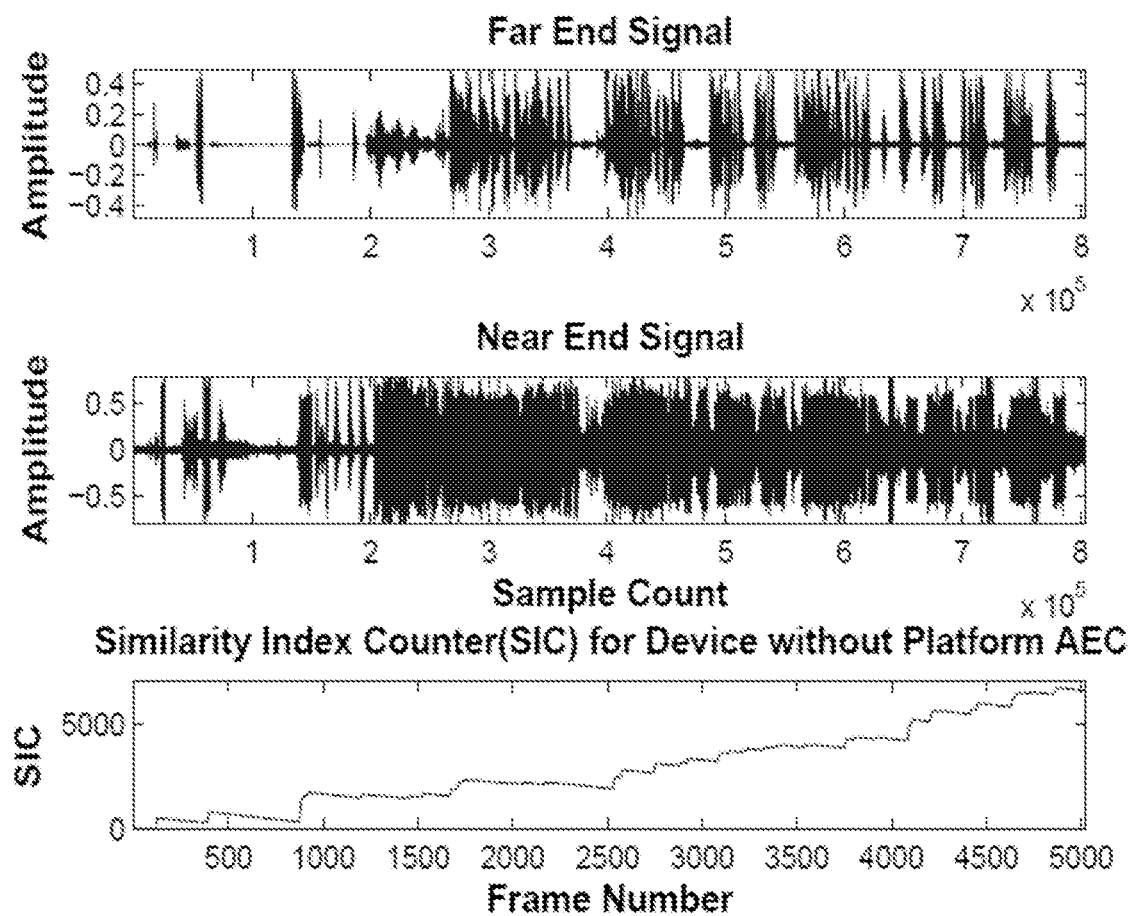
FIG. 7 shows a similarity index counter for a device without a platform AEC.

The algorithm was also tested with communication devices that did not have a platform AEC. FIG. 7 illustrates SIC values measured for different frames for a device that does not have an AEC in its audio interface. As echo is very predominant in the microphone output, the SIC is noticeably very high. Hence, the algorithm does not disable the application AEC. During headset mode when Echo Return Loss (ERL) is more than 60 dB, the algorithm generates a false alarm and confirms the presence of a platform AEC since echo is not observed in microphone output. A similar decision was observed in few cases of handset mode if ERL was greater than 60 dB. These false alarms do not impact overall voice quality, however, as they only occurred in situations of high ERL when the application AEC was not required anyway.

Examples of suitable values for the various constants mentioned in the equations above are given in the table below. These are values that the inventors have found to work well in practice, but it should be understood that they are examples only and the invention is not limited to using any particular values.

TABLE 1 thresholds and constants

| Threshold | Value |
|---|---|
| $\alpha$ | 2 |
| $\zeta_1$ | 3 |
| $\zeta_2$ | $4.6 * 10^{-7}$ |
| $\zeta_3$ | 100 |
| $\zeta_5$ | 500 |
| $\zeta_6$ | $4 * \beta_7$ |
| $\beta_1$ | 0.0313 |
| $\beta_2$ | 0.0156 |
| $\beta_3$ | $0.6667 * \beta_2$ |
| $\beta_4$ | $65534 * \beta_2$ |
| $\beta_5$ | $4.6 * 10^{-8}$ |
| $\beta_6$ | $2.4 * 10^{-4}$ |
| $\beta_7$ | $6.1 * 10^{-5}$ |
| L | $2 * 10^{14}$ |
| M | 100 |
| N | 32 |

Generally, any of the functions, methods, techniques or components described above can be implemented in modules using software, firmware, hardware (e.g., fixed logic circuitry), or any combination of these implementations. The terms "module," "functionality," "component", "block" and "logic" may be used herein to generally represent software, firmware, hardware, or any combination thereof.

In the case of a software implementation, the module, functionality, component or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples. Any range or value given herein may be extended or altered without losing the effect sought, as will be apparent to the skilled person. The steps of the methods described herein may be carried out in any suitable order, or simultaneously where appropriate.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A communication device comprising:
   a first acoustic echo canceller configured to receive a microphone signal and to produce a near-end signal;
   a second acoustic echo canceller configured to receive the near-end signal and to cancel an echo of a far-end signal that is present in the near-end signal before it is transmitted from the communication device to a far-end communication device; and
   an echo cancellation detector for controlling the second acoustic echo canceller, the echo cancellation detector comprising:
      a comparison generator configured to compare the far-end signal with the near-end signal;
      a decision unit configured to, based on the comparison, make a determination that the first acoustic echo canceller is underperforming; and
      a controller configured to, in dependence on the determination, control the second acoustic echo canceller to be in a state in which it is operating so as to cancel the echo of the far-end signal from the near-end signal to produce an echo cancelled near-end signal to be transmitted to the far-end communication device.

2. The communication device as claimed in claim 1, wherein the echo cancellation detector is configured to monitor whether the first acoustic echo canceller is successfully removing far-end echo from the microphone signal in order to provide the near-end signal.

3. An echo cancellation detector for controlling a second acoustic echo canceller that is configured to, before an echo-cancelled near-end signal is to be transmitted from a near-end communication device to a far-end communication device, cancel the echo of a far-end signal that is present in the near-end signal, the echo cancellation detector comprising:
   a comparison generator configured to compare the far-end signal with the near-end signal;
   a decision unit configured to, based on the comparison, make a determination that a first acoustic echo canceller arranged to receive a microphone signal and to produce the near-end signal is underperforming; and
   a controller configured to, in dependence on the determination by the decision unit, control the second acoustic echo canceller at the near-end communication device to be in a state in which it is operating so as to cancel the echo of the far-end signal from the near-end signal to produce the echo-cancelled near-end signal to be transmitted to the far-end communication device.

4. The echo cancellation detector as claimed in claim 3, wherein the decision unit is further configured to make a second determination as to whether or not the first acoustic echo canceller is present in the near-end communication device.

5. The echo cancellation detector as claimed in claim 4, wherein the controller is further configured to control the second acoustic echo canceller to be in the state in which it is operating in response to the second determination that the first acoustic echo canceller is not present.

6. The echo cancellation detector as claimed in claim 4, wherein the echo cancellation detector is configured to monitor whether the first acoustic echo canceller is successfully removing far-end echo from a microphone signal in order to provide the near-end signal.

7. The echo cancellation detector as claimed in claim 3, wherein the controller is configured to control the second acoustic echo canceller to be in the state in which it is operating to remove far-end echo from the near-end signal in response to the first acoustic echo canceller not successfully removing far-end echo from the microphone signal.

8. The echo cancellation detector as claimed in claim 3, wherein each of the far-end signal and the near-end signal have a frequency spectrum, and the comparison generator is configured to compare an indication of the frequency spectrum of the far-end signal with an indication of the frequency spectrum of the near-end signal.

9. The echo cancellation detector as claimed in claim 3, the comparison generator being configured to compare a binary representation of the frequency spectrum of the far-end signal with a binary representation of the frequency spectrum of the near-end signal.

10. The echo cancellation detector as claimed in claim 3, wherein the echo cancellation detector is further configured to confirm that a far-end voice is present before comparing the far-end signal with the near-end signal.

11. The echo cancellation detector as claimed in claim 3, wherein the echo cancellation detector is configured to, when the second acoustic echo canceller is in the state in which it is operating, output the echo cancelled near-end signal to a transmitter configured to transmit the echo-cancelled near-end signal produced by the second acoustic echo canceller to the far-end communication device.

12. The echo cancellation detector as claimed in claim 3, wherein the first acoustic echo canceller is a platform acoustic echo canceller and the second acoustic echo canceller is an application acoustic echo canceller.

13. A method for cancelling an echo of a far-end signal in a near-end signal from a first acoustic echo canceller arranged to receive a microphone signal and to produce the near-end signal, the method comprising:

comparing the far-end signal with the near-end signal;

based on the comparison, making a determination that the first acoustic echo canceller is underperforming; and in dependence on the determination, operating a second acoustic echo canceller to be in a state in which it is operating so as to, before an echo cancelled near-end signal is to be transmitted from a near-end communication device to a far-end communication device, cancel the echo of the far-end signal from the near-end signal to produce the echo cancelled near-end signal.

14. The method as claimed in claim 13, wherein the method comprises:

monitoring whether the first acoustic echo canceller is successfully removing far-end echo from the microphone signal in order to provide the near-end signal.

15. The method as claimed in claim 13, wherein the method comprises controlling the second acoustic echo canceller to be in the state in which it is operating in response to the first acoustic echo canceller not successfully removing far-end echo from the microphone signal.

16. The method as claimed in claim 13, wherein the method comprises, where each of the far-end signal and the near-end signal have a frequency spectrum, comparing an indication of the frequency spectrum of the far-end signal with an indication of the frequency spectrum of the near-end signal.

17. The method as claimed in claim 13, wherein the method comprises comparing a binary representation of the frequency spectrum of the far-end signal with a binary representation of the frequency spectrum of the near-end signal.

18. The method as claimed in claim 13, wherein the method comprises, when the second acoustic echo canceller is in the state in which it is operating, outputting the echo-cancelled near-end signal to a transmitter configured to transmit the echo-cancelled near-end signal produced by the second acoustic echo canceller to the far-end communication device.

* * * * *